(12) United States Patent
Chao (10) Patent No.: US 7,634,132 B2
(45) Date of Patent: Dec. 15, 2009

(54) METHOD AND APPARATUS OF FALSE COLOR SUPPRESSION

(75) Inventor: Po-Wei Chao, Taipei Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 710 days.

(21) Appl. No.: 11/279,400

(22) Filed: Apr. 12, 2006

(65) Prior Publication Data

US 2006/0228022 A1   Oct. 12, 2006

(30) Foreign Application Priority Data

Apr. 12, 2005   (TW) .............................. 94111469 A (51) Int. Cl.
*G06K 9/00* (2006.01)
*G06K 9/40* (2006.01)

(52) U.S. Cl. ........................................ 382/162; 382/275

(58) Field of Classification Search ......... 382/162–167, 382/274–275, 236, 103, 107, 190–195, 199, 382/201; 345/589–605; 348/441–459, 533, 348/606–624, 649–670; 358/1.9, 518–522, 358/3.26–3.27; 714/701–702
See application file for complete search history.

(56) References Cited

U.S. PATENT DOCUMENTS

| | | | |
|---|---|---|---|
| 4,477,843 A | 10/1984 | Kinjo et al. | |
| 4,685,002 A | 8/1987 | Powers | |
| 4,864,389 A | 9/1989 | Faroudja et al. | |
| 4,982,280 A | 1/1991 | Lyon et al. | |
| 4,989,090 A | 1/1991 | Faroudja | |
| 5,134,480 A | 7/1992 | Wang | |
| 5,291,280 A | 3/1994 | Faroudja et al. | |
| 5,305,120 A * | 4/1994 | Faroudja | 348/624 |
| 5,502,508 A | 3/1996 | Kawabata | |
| 5,523,798 A | 6/1996 | Hagino | |
| 5,625,421 A | 4/1997 | Faroudja | |
| 5,671,018 A | 9/1997 | Ohara | |
| 5,748,250 A | 5/1998 | Markandey et al. | |
| 5,892,553 A | 4/1999 | Delmas | |
| 6,133,957 A | 10/2000 | Campbell | |
| 6,188,445 B1 | 2/2001 | Taketani | |
| 6,333,764 B1 | 12/2001 | Robinson | |
| 6,414,719 B1 | 7/2002 | Parikh | |
| 6,417,887 B1 | 7/2002 | Yamaji | |
| 6,421,090 B1 | 7/2002 | Jiang et al. | |
| 6,459,455 B1 | 10/2002 | Jiang et al. | |
| 6,545,719 B1 | 4/2003 | Topper | |

(Continued)

FOREIGN PATENT DOCUMENTS

TW       266377       12/1995

(Continued)

*Primary Examiner*—Sherali Ishrat
(74) *Attorney, Agent, or Firm*—Winston Hsu (57) ABSTRACT

A false-color suppression method for correcting a pixel value of a target position of an output frame corresponding to a target field is disclosed. The false-color suppression method includes determining whether the target position has motion; determining whether image corresponding to the target position meets a predetermined condition; and if the target position is determined to have motion and the image corresponding to the target position meets the predetermined condition, performing at least one false-color suppression operation to correct the pixel value of the target position of the output frame.

18 Claims, 4 Drawing Sheets

U.S. PATENT DOCUMENTS

| | | |
|---|---|---|
| 6,686,923 B2 | 2/2004 | Ji et al. |
| 6,757,022 B2 | 6/2004 | Wredenhagen et al. |
| 6,784,942 B2 | 8/2004 | Selby |
| 6,986,081 B1 | 1/2006 | Furutani |
| 7,092,038 B2 | 8/2006 | Shih |
| 7,271,850 B2 * | 9/2007 | Chao .......................... 348/609 |
| 7,280,159 B2 * | 10/2007 | Chao .......................... 348/609 |
| 7,397,515 B2 * | 7/2008 | Walls et al. ................. 348/624 |
| 7,440,031 B2 | 10/2008 | Jung |
| 7,460,180 B2 * | 12/2008 | Chao .......................... 348/624 |
| 7,554,610 B2 * | 6/2009 | Zhu .......................... 348/609 |
| 2004/0212732 A1 | 10/2004 | Matsuzaki |

FOREIGN PATENT DOCUMENTS

| | | |
|---|---|---|
| TW | 398157 | 7/2000 |
| TW | 457782 | 10/2001 |
| TW | 533741 | 5/2003 |
| TW | 589905 | 6/2004 |
| TW | 594659 | 6/2004 |

* cited by examiner

METHOD AND APPARATUS OF FALSE COLOR SUPPRESSION

BACKGROUND OF THE INVENTION

1. Field of the Invention

The invention relates to image processing techniques, and more particularly, to false-color suppression methods and related apparatuses.

2. Description of the Prior Art

Typically, the television signal (such as an NTSC standard signal or PAL standard signal) is composed of luminance signal and chrominance signal. In general, the luminance signal and chrominance signal are superimposed on the same carrier within the television signal. When the television receives signals, the television will separate the luminance signal and the chrominance signal to display image on the screen.

However, incomplete separation of the luminance signal and the chrominance signal results in a cross-color effect and a cross-luminance effect. These effects cause faults such as false-color artifacts in the screen image. That is, the performance of false-color suppression (i.e., the ability to suppress false-color) greatly affects the image quality of the image displayed on the screen.

SUMMARY OF THE INVENTION

It is therefore one of the many objectives of the claimed invention to provide a method and apparatus of false-color suppression for improving the performance of false-color suppression.

An exemplary embodiment of a false-color suppression method for correcting a pixel value of a target position of an output frame, the false-color suppression method comprising: generating a first motion value corresponding to the target position; determining whether the target position has motion; generating at least a second motion value, wherein each second motion value is corresponding to a reference position of the target position; determined a degree of variation between the first motion value and the second motion value; and if the target position is determined to have motion and the degree of variation is less than a first threshold value, performing a false-color suppression operation to correct the pixel value of the target position of the output frame.

Another exemplary embodiment of a false-color suppression method for correcting a pixel value of a target position of an output frame, the false-color suppression method comprising: determining whether the target position has motion; determining whether image corresponding to the target position meets a predetermined condition; and if the target position is determined to have motion and the image corresponding to the target position meets the predetermined condition, performing a false-color suppression operation to correct the pixel value of the target position of the output frame.

Another exemplary embodiment of a false-color suppression device, comprising: an motion detector for determining whether a target position has motion; an image feature detector determining whether image corresponding to the target position meets a predetermined condition; a calibration unit; and a determining unit, coupled to the motion detector, the image feature detector and the calibration unit, for determining whether there is a need exists to control the calibration unit to correct a pixel value of the target position of an output frame according to a determining result from the motion detector and the image feature detector.

These and other objectives of the present invention will no doubt become obvious to those of ordinary skill in the art after reading the following detailed description of the preferred embodiment that is illustrated in the various figures and drawings.

DETAILED DESCRIPTION

The innovative false-color suppression method of the present invention is Briefly stated as follows: when a target position of a frame is determined to have motion, i.e. the image corresponding to the target position is not a still image, if the image corresponding to the target position meets certain specific image feature condition, a false-color suppression operation is still preformed to correct the pixel value of the target position of the frame.

Please note that, the false-color suppression method and related apparatus described in the embodiments of the present invention can be utilized in a variety of applications. For example, this method and apparatus can be utilized for the operations of motion adaptive de-interlacing or motion compensation de-interlacing. In addition, the false-color suppression method of the present invention can be performed while de-interlacing the video data or after the de-interlacing operation of the video data is finished.

In addition, what is referred to as pixel value in the present invention can be regarded as the luminance of the pixel, the chrominance of the pixel, or other value well known in or later introduced to the art.

Figure 1:
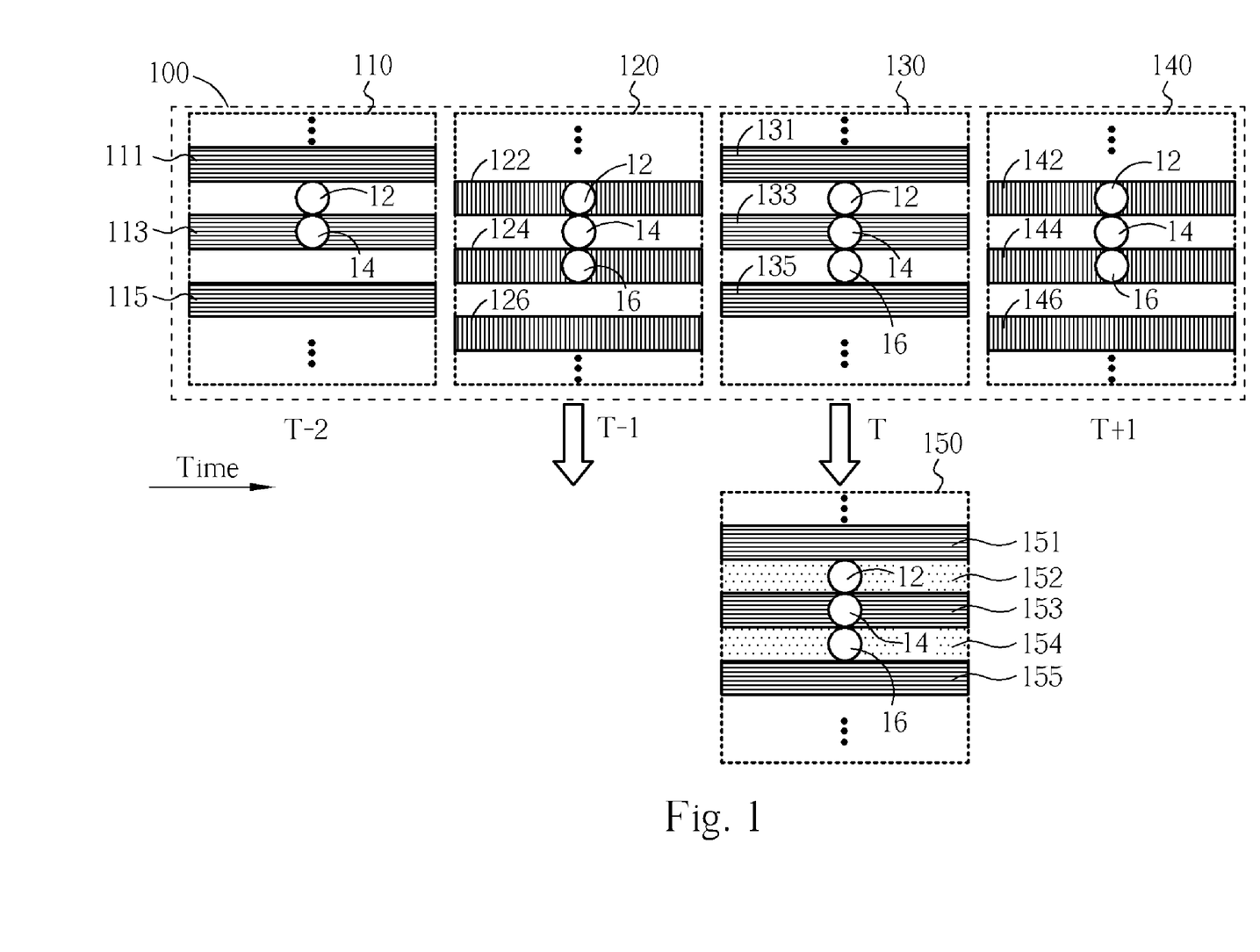
FIG. 1 is a schematic diagram showing the relationship between a video data and a corresponding output frame.

Please refer to FIG. 1. FIG. 1 is a schematic diagram of the relationship between a video data 100 and a corresponding output frame 150. The output frame 150 corresponds to time T, and the four continuous fields 110, 120, 130, and 140 of the video data 100 respectively corresponds to time T−2, T−1, T and T+1. The scan-lines 111, 122, 131, and 142 are respectively perceived as the scan-line N−1 of the fields 110, 120, 130, and 140; the scan-lines 113, 124, 133, and 144 are respectively perceived as the scan-line N of the fields 110, 120, 130, and 140; and scan-lines 115, 126, 135, and 146 are respectively perceived as the scan-line N+1 of the fields 110, 120, 130 and 140. Each scan-line comprises a plurality of pixels. In this embodiment, the output frame 150 is generated by de-interlacing the video data 100.

Generally speaking, the de-interlacing process can directly adopt without alteration or modification the scan-lines 131, 133 and 135 of the target field 130 corresponding to time T as the scan-lines 151, 153 and 155 of the output frame 150. However, this only serves as one example for scan-line setting, and is not meant to be taken as limitation. As for the pixels of scan-lines 152 and 154 of the target frame 150, they are then generated from the interpolation operation of the pixel of video data 100. For example, when the image around the position 16 of the field 130 is determined to be still, an inter-field interpolation operation can be performed to generate the pixel value of the position 16 of the output frame 150 according to the pixel value corresponding to the target position 16 of the fields 120 and 140. Otherwise, if the image around the position 16 of the output frame 150 is determined to have motion, an intra-field interpolation operation will generally be performed to generate the pixel value of the pixel of the position 16 of the output frame 150 according to the existing pixel value of the position 16 of the output frame 130. Since the de-interlacing operation is well known to those skilled in this art, further description is omitted here for brevity.

Figure 2:
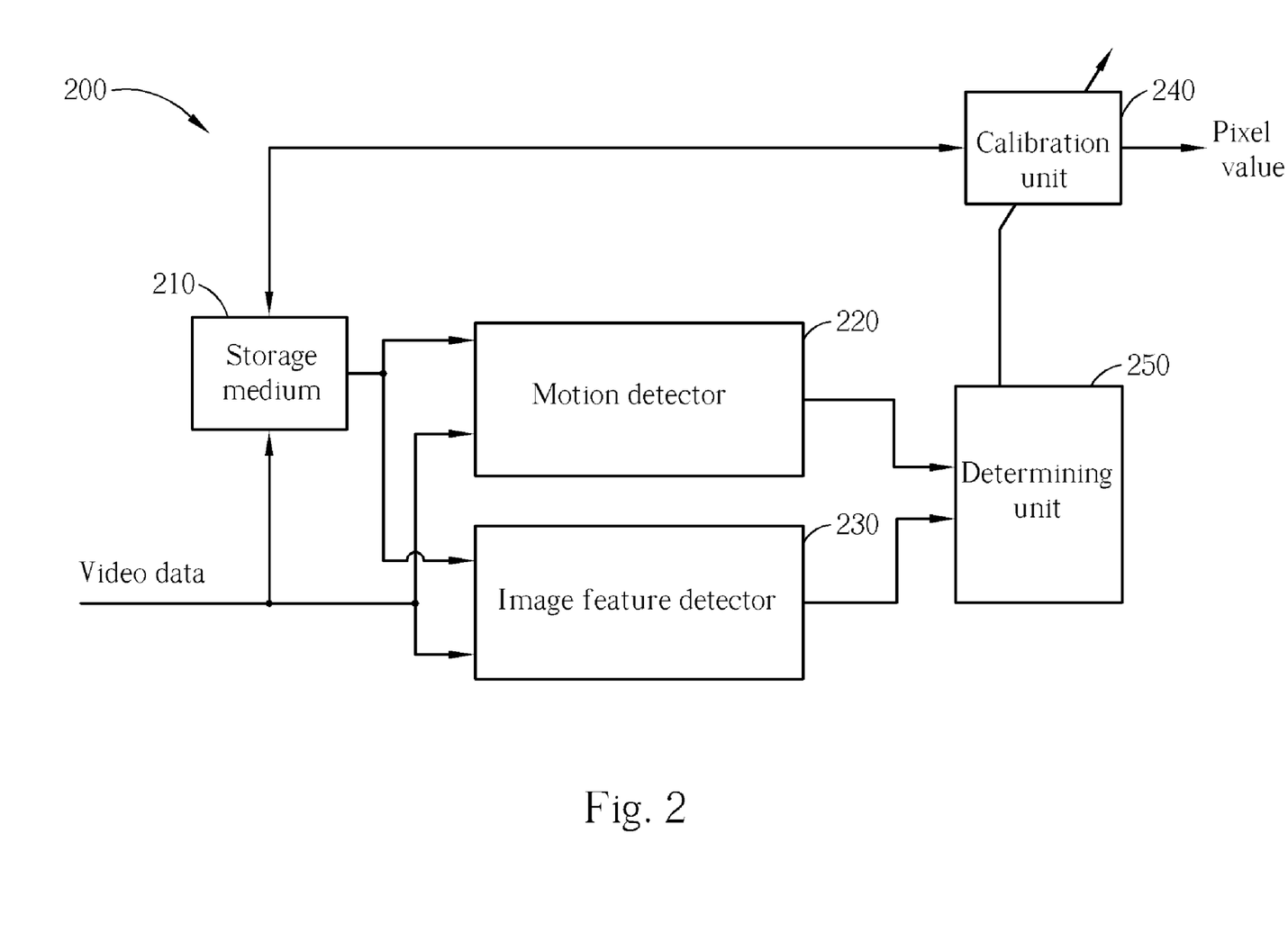
FIG. 2 is a block diagram of a false-color suppression device according to an embodiment of the present invention.

Please refer to FIG. 2. FIG. 2 is a block diagram of a false-color suppression device 200 according to an embodiment of the present invention. The false-color suppression device 200 includes a storage medium 210, an motion detector 220, an image feature detector 230, a calibration unit 240, and a determining unit 250. The storage medium 210 is used to temporarily store the pixel data needed in the process of false-color suppression operation. The storage medium 210 is normally achieved by a buffer or a memory. In one embodiment, the motion detector 220 performs motion detection on the received video data on a pixel-by pixel basis, and the image feature detector 230 examines, also on a pixel-by-pixel basis, whether the image corresponding to the pixel of the video data meets the specific image feature. Next, according to the detection results from the motion detector 220 and the image feature detector 230, the determining unit 250 determines whether the calibration unit 240 needs to perform a false-color suppression operation to correct the pixel value of the output frame 150.

Figure 3:
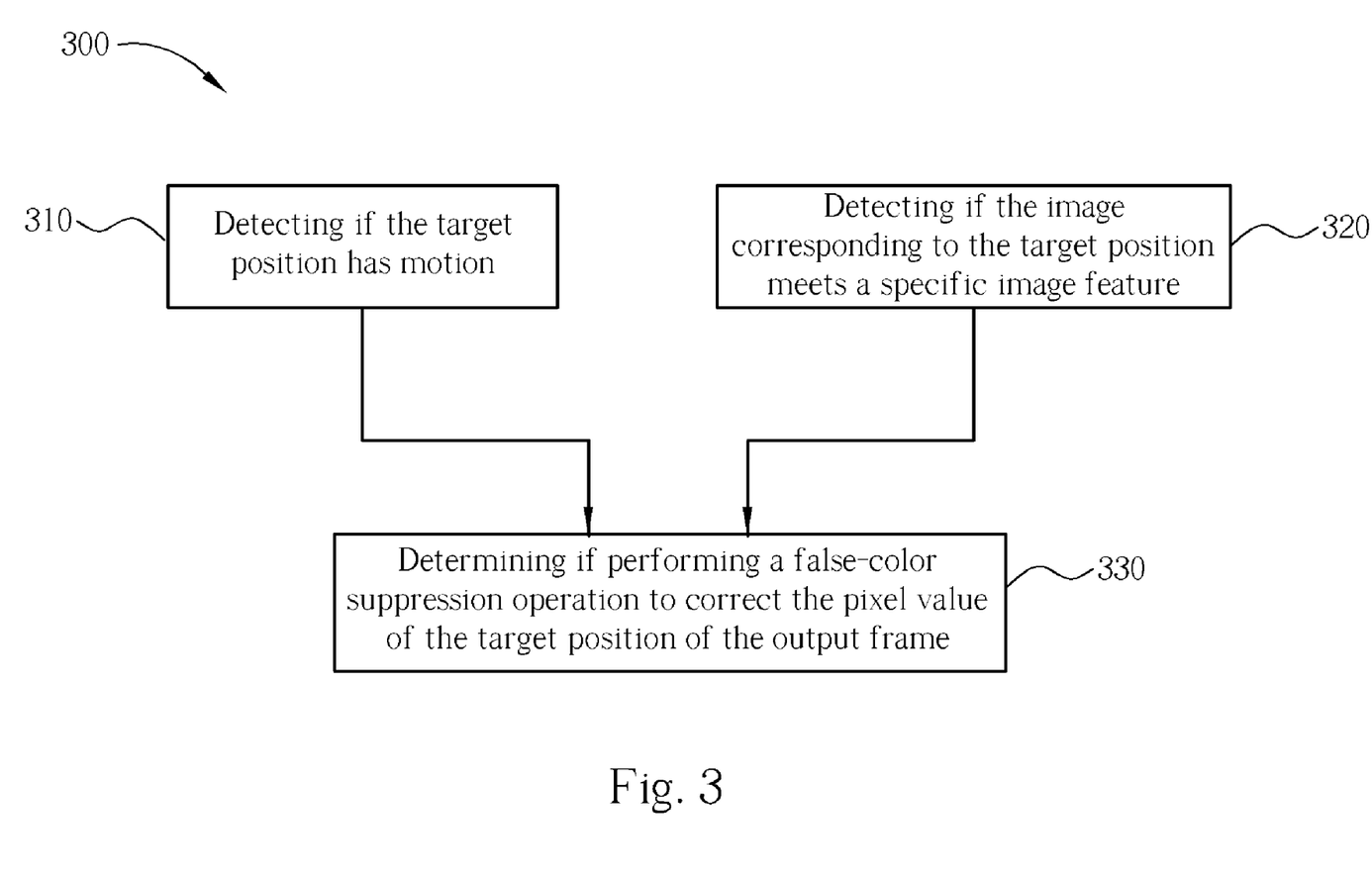
FIG. 3 shows a flowchart describing a false-color suppression method according to one embodiment of the present invention.

FIG. 3 shows a flowchart 300 describing a false-color suppression method according to one embodiment of the present invention. The flowchart 300 illustrates the operation of the false-color suppression method to correct the pixel value of the target position 14 of the output frame 150.

In step 310, the motion detector 220 detects and determines whether the image at the target position 14 of the output frame 150 has motion. Since the output frame 150 is corresponding to the target field 130, the motion detector 220 can determine whether the target position 14 of the target field 150 has motion by detecting whether the target position 14 of the target field 130 has motion. In practice, the motion detector 220 can be designed for detecting inter-frame motion or inter-field motion, or both. For instance, the motion detector 220 may detect the degree of difference between target field 130 and the preceding field 120 with respect to the target position 14 and/or detect the degree of difference between the target field 130 and the field 110 with respect to the image at or around the target position 14 to determine whether the image at or around the target position 14 of the target field 130 has motion. As it will be easily observed by a personal of ordinary skill in the art, the above-mentioned degree of difference between images can be implemented using sum of absolute differences (SAD) between a plurality of pixels of a first field and a plurality of pixels of a second field, or using other known or new methods in the art. For example, in detecting the degree of difference between the images at or around the target position 12 of the fields 130 and 120, the SAD value between the pixels in the (N−1)th, Nth, and (N+1)th scan lines 131, 133, and 135 of the target field 130 (that is to say, for instance, the pixel values of and surrounding the pixel 10 of field 130) and the pixels in the (N−1)th, Nth, and (N+1)th scan lines 122, 124, and 126 of the former field 120 (that is to say, for instance, the pixel values of and surrounding the pixel 12 of field 120) is first calculated. It is then determined whether there is inter-field motion at or around the target position 12 according to such a calculated SAD value. Similarly, in detecting the degree of difference between the images at or around the target position 12 of the fields 130 and 110, the SAD value between the pixels in the (N−1)th, Nth, and (N+1)th scan lines 131, 133, and 135 of the target field 130 (that is to say, for instance, the pixel values of and surrounding the pixel 10 of field 130) and the pixels in the (N−1)th, Nth, and (N+1)th scan lines 111, 113, and 115 of the former field 110 (that is to say, for instance, the pixel values of and surrounding the pixel 10 of field 110) is first calculated. It is then determined whether there is inter-frame motion at or around the target position 12 according to such a calculated SAD value.

Typically, the motion detector 220 calculates an motion value corresponding to the target position 14 of the target field 130 while performing the above-mentioned motion detection and the motion detector 220 can determine whether the image at the target position 14 of the target field 130 has motion according to the motion value. In practice, the motion detector 220 can embody the present technology and circuits or yet to be realized technology, the operation and practice process are well known to those skilled in the art therefore a detailed description is omitted here for the sake of brevity.

In step 320, the image feature detector 230 detects and determines whether the image corresponding to the target position 14 of the output frame 150 meets certain specific image feature (e.g., slow motion image or zooming image). In this embodiment, what is called slow motion image is related to the image that is in motion (namely determined to be in a non-still condition) but the speed of motion is less than a threshold value. And the speed of motion can be determined by the pixel distance of the image (usually one part of one object) in two contiguous frames, or by the ratio of the motion distance of the image within a predetermined time to span the length or width of the whole frame, or both. What is called zooming image is one that is gradually magnified or gradually reduced in size. The means of detecting slow motion image and zooming image is illustrated in detail hereinafter.

Next, in step 330, according to the results from the motion detector 220 and the image feature detector 230, the determining unit 250 will determine if the calibration unit 240 will be utilized for performing a false-color suppression operation to correct the pixel value of the target position 14 of the output frame 150. More specifically, in this embodiment, when the image corresponding to the target position 14 is determined to have no motion, or to have motion but the corresponding motion is slow motion, zooming motion or other conditions which meet the specific feature, the determining unit 250 will control the calibration unit 240 to perform a false-color suppression operation to correct the pixel value of the target position 14 of the output frame 150. If the video data 100 is a NTSC standard format data, the reference pixel value of the target position 14 of the field 110 corresponding to time T−2 can be utilized to correct the pixel value of the target position 14 of the output frame 150. In general, the false-color suppression operation includes cross-color suppression operation or cross-luminance suppression operation or both. Since both cross-color and cross-luminance suppression operations are well known to those skilled in this art, further description is omitted here for the sake of brevity.

By experiments, it is found that even if the target position 14 of the target field 130 is determined to have motion, as long as the image corresponding to the target position 14 meets the above-mentioned specific image feature, the image quality of the output frame 150 can be improved by performing the false-color suppression operation on the pixel value of the target position 14 of the output frame 150.

If the target position 14 of the target field 130 is determined to have motion and the image corresponding to the target position do not meets the above-mentioned specific image feature, the determining unit 250 will not control the calibration unit 240 to perform the false-color suppression operation on the pixel value of the target position 14 of the output frame 150.

It should also be noted that the action of comparing the first motion value and the first threshold value, which is executed by the motion detector 220 in step 310, also could be executed by the determining unit 250 in step 330. Moreover, the above-mentioned sequence of step 310 and step 320 is not limited, that is, the step 310 and step 320 can be performed in sequence as in one after the other or simultaneously. In practice, the detection process in step 320 can be performed only when the target position 14 of the target field 130 is determined to have motion in step 310. Furthermore, the motion detector 220 and image feature detector 230 shown in FIG. 1 are only functional blocks utilized for illustrating the false-color suppression method in the embodiment of the present invention. In practice, the motion detector 220 and image feature detector 230 can be designed and implemented in the same circuit or chip, or can be designed and implemented in circuits or chips.

Regarding to the determination of the specific image feature, The detection of slow motion image and zooming image are taken as examples and are described as follows. With regard to the zooming image, when a video image changes responsive to a zooming operation (either zooming-in or zooming-out) during video graphing, the motion of the image generally maintains uniform speed and fixed direction throughout a particular time period. As regard to the slow motion image, it refers to the speed of motion being less than a threshold value. Certainly, the above-mentioned examples of image features are only one of the embodiments rather than restrictions of the present invention. In practice, a variety of determining conditions can be designed to identify different image features. In one embodiment of the present invention, the above-mentioned specific image feature is programmable.

Figure 4:
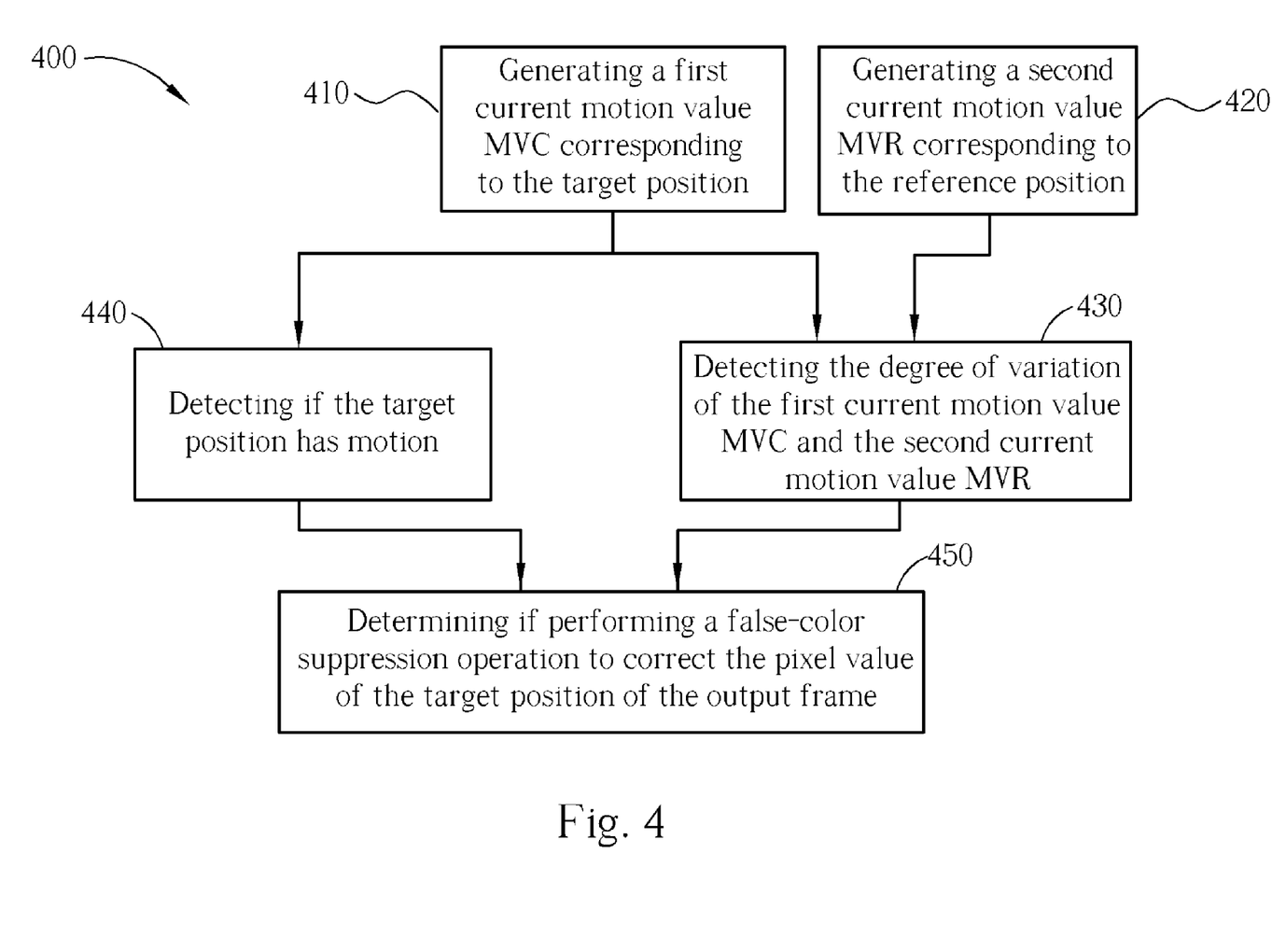
FIG. 4 shows a flowchart describing a false-color suppression method according to another embodiment of the present invention.

Please refer to FIG. 4. FIG. 4 shows a flowchart 400 describing a false-color suppression method according to another embodiment of the present invention. In this preferred embodiment, the function provided by the above-mentioned image feature detector 230 will be achieved by the cooperation of the motion detector 220 and the determining unit 250. The steps of flowchart 400 are described as below:

In step 410, the motion detector 220 will generate a first current motion value MVC which corresponds to the target position 14 of the target field 130. In this preferred embodiment, the operation of step 410 is similar to the above-mentioned step 310, and therefore detailed description is omitted here for the sake of brevity.

In step 420, the motion detector 220 selects one pixel position around the target position 14 as a reference position, and generates a second current motion value MVR that is corresponding to the reference position. The reference position can be chosen at the target field 130 or the neighbor field of the target field 130 (e.g., the former field 120). For example, in this preferred embodiment, the position 12 of the target field 130 is selected as the reference position. The motion detector 220 can generate the second current motion value MVR according to the degree of difference of the reference position 12 between the field 130 and the late field 120, the degree of difference of the reference position 12 between the field 130 and the former field 110, or the degree of difference of the reference position 12 between field 120 and field 140.

In a preferred embodiment, in order to minimize the amount of calculation in the subsequent process, the false-color suppression device 200 may utilize the storage medium 210 or a buffer, to temporarily store part of the first motion value generated from the previous detecting process of the motion detector 220. For example, if the first motion value corresponding to a reference position selected by the motion detector 220 has already been stored in the storage medium 210 (or the buffer), then the first motion value of the reference position can be employed as the second motion value of the selected reference position. Thus, the amount of operations performed by the motion detector 220 can be reduced.

Please also note that, in practice the order of step 410 and the step 420 being performed is not limited.

Next, in step 430, according to the degree of variation between the first current motion value MVC and the second current motion value MVR, the determining unit 250 will determine whether the image at or around the target position 14 of the target field 130 meets the specific image feature. In practice, the degree of variation between the first current motion value MVC and the second current motion value MVR can be determined by the change rate, the normalized change rate, variance, coefficient of variation therebetween, or other well-known parameters representing degree of variation. When the image at or around the target position 14 of the target field 130 meets the above-motioned specific image feature, such as experiencing a slow motion and a zooming motion, the degree of variation between the first current motion value MVC and the second current motion value MVR will normally exist within a predetermined range.

For example, if the image at or around the target position 14 of the target field 130 is a slow motion image, then even though both the first current motion value MVC and the second current motion value MVR exceed a threshold value, below which indicated a still image. The difference between the first current motion value MVC and the second current motion value MVR still remains within certain range; that is to say, the degree of variation between the first current motion value MVC and the second current motion value MVR lies within the predetermined range. However, if the image at or around the target position 14 of the target field 130 is a fast motion image, namely the speed of motion of the image is greater than a predetermined value, then the degree of variation between the first current motion value MVC and the second current motion value MVR will normally be higher than an upper limit of the predetermined range. In other words, the determining unit 250 of the present invention determines whether the image at or around the target position meets the above-mentioned specific image feature according to the image content or the image feature (e.g., whether the displacement, the speed, or the acceleration of motion is similar) of the target position 14 and the nearby reference position 12. In practice, the predetermined range can be set or adjusted by the designers.

In step 440, the motion detector 220 will detect whether the target position 14 of the target field 130 has motion. The motion detector 220 can compare the first current motion value MVC generated from the step 410 with a first threshold value and determine whether the target position 14 of the target field 130 has motion. In addition, the motion detector 220 also can detect the motion by other motion detection methods.

In practice, the determining unit 250 can also detect whether the target position 14 of the target field 130 has motion according to the degree of variation between the first current motion value MVC and the second current motion value MVR. When the target position 14 of the target field 130 is determined to have no motion, the degree of variation between the first current motion value MVC and the second current motion value MVR is normally less than a lower limit of the predetermined range.

In step 450, according to the results from step 430 and step 440, the determining unit 250 will determine whether the calibration unit 240 is utilized for performing a false-color suppression operation to correct the pixel value of the target position 14 of the output frame 150. More specifically, if the target position 14 of the target field 130 is determined to have no motion, or if the target position 14 of the target field 130 is determined to have motion but the degree of variation between the first current motion value MVC and the second current motion value MVR is within the predetermined range, the determining unit 250 will determine that the image corresponding to the target position 14 of the target field 130 meets the above-mentioned specific image features. Therefore, the determining unit 250 will control the calibration unit 240 to perform the false-color suppression operation for correcting the pixel value of the target position 14 of the output frame 150.

In another embodiment, as long as the degree of variation between the first current motion value MVC and the second current motion value MVR is less than the upper limit of the predetermined range, the determining unit 250 will control the calibration unit 240 to perform the false-color suppression operation on the pixel value of the target position 14 of the output frame 150.

When the result in step 440 shows that the target position 14 of the target field 130 is determined to have motion, and the result in step 430 shows that the degree of variation between the first current motion value MVC and the second current motion value MVR is greater than the upper limit of the predetermined range, the determining unit 250 will determine that the image corresponding to the target position 14 does not meet the above-mentioned specific image feature, and therefore, the calibration unit 240 is not utilized to perform a false-color suppression operation upon the pixel value of the target position 14 of the output frame 150.

Please note that, the present invention does not limit as to the number of the reference position selected in step 420 and the distance from each reference positions to the target position 14. For instance, the selected reference position can be located at the former field 120, or partially located at the target field 130 and partially located at the former field 120.

When the target position 14 of the position field 130 has motion, but the image meets the above-mentioned specific image feature (e.g., the motion is slow motion or zooming motion), an image edge will be generated and the image edge usually moves toward or passes through the target position 14 of the target field 130. The motion speed of the edge is normally less than a predetermined value. In practice, according to the first current motion value MVC and the second current motion value MVR generated from the above-mentioned step 410 and step 420, the determining unit 250 can determine whether an edge with motion speed less then a predetermined value is passing through the target position 14 of the target field 130. If an edge with motion speed less than a predetermined value is passing through the target position 14 of the target field 130, the degree of variation between the first current motion value MVC and the second current motion value MVR will be normally less then the upper limit of the predetermined range.

In other words, when a target position has motion, the false-color suppression method of the present invention is related to determine if performing the false-color suppression operation according to if image corresponding to the target position meets a specific image feature. As will be easily observed by a person of ordinary skill in the art, the methods mentioned in the present invention are only examples to determine whether image corresponding to the target position meets a specific image feature, and are not meant to be taken as limitations.

As mentioned above, the false-color suppression method of the present invention can be executed after finishing the de-interlacing operation of the output frame 150, or it can be executed while de-interlacing the output frame 150. Hence, in practice the above-mentioned storage medium 210 and the motion detector 220 may be achieved respectively by a memory and the motion detection apparatus of a de-interlacing apparatus for generating the output frame 150 in order to reduce the cost of hardware.

Please also note that, although the above-mentioned preferred embodiment is applied in NTSC system, it is considered well known to those skilled in the art that the disclosed false-color suppression method and apparatus can also be applied in other television systems (e.g., the PAL system). Take the PAL system as an example, when the above-mentioned method determines that the target position 14 of the output frame 150 should be processed by the false-color suppression operation, the calibration unit 240 can utilize a reference pixel value corresponding to the target position 14 in the field which precedes two time spots (i.e., time T−4) of the field 110 to correct the pixel value of the target position 14 of the frame 150.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A false-color suppression method for correcting a pixel value of a target position of an output frame, the false-color suppression method comprising:
   determining whether the target position has motion;
   determining whether image corresponding to the target position meets a predetermined condition; and
   if the target position is determined to have motion and the image corresponding to the target position meets the predetermined condition, performing a false-color suppression operation to correct the pixel value of the target position of the output frame.

2. The method of claim 1, wherein the false-color suppression operation utilizes a pixel value of a reference pixel to correct the pixel value of the target position of the output frame.

3. The method of claim 2, wherein the output frame is corresponding to time T, and the reference pixel is located at the target position of a field corresponding to the time T−2.

4. The method of claim 2, wherein the output frame is corresponding to time T, and the reference pixel is located at the target position of a field corresponding to the time T−4.

5. The method of claim 1, wherein the predetermined condition is that an edge is approximating to the target position of the target field.

6. The method of claim 1, wherein the predetermined condition is that an edge is passing through the target position.

7. The method of claim 1, wherein the predetermined condition is that an edge, which moves slower than a predetermined value, is passing through the target position.

8. The method of claim 1, wherein the predetermined condition is that the target position is corresponding to a zooming image.

9. The method of claim 1, wherein the predetermined condition is that the target position is corresponding to a slow motion image.

10. The method of claim 1, wherein the step of determining whether the target position has motion further comprises:
generating a first motion value corresponding to the target position; and
determining whether the target position has motion according to the first motion value.

11. The method of claim 10, wherein the predetermined condition is that the variation degree of the first motion value is less than a threshold value.

12. The method of claim 10, further comprising:
generating at least a second motion value, wherein each second motion value is corresponding to a reference position and each reference position comprises at least one pixel;
wherein the step of determining whether image corresponding to the target position meets a predetermined condition further comprises determining whether image corresponding to the target position meets a predetermined condition according to the first motion value and the second motion value.

13. A false-color suppression device, comprising:
an motion detector for determining whether a target position has motion;
an image feature detector determining whether image corresponding to the target position meets a predetermined condition;
a calibration unit; and
a determining unit, coupled to the motion detector, the image feature detector and the calibration unit, for determining whether a need exists to control the calibration unit to correct a pixel value of the target position of a output frame according to a determining result from the motion detector and the image feature detector.

14. The device of claim 13, wherein the predetermined condition is that the target position is corresponding to a zooming image.

15. The device of claim 13, wherein the predetermined condition is that the target position is corresponding to a slow motion image.

16. The device of claim 13, wherein when the target position has motion and the image corresponding to the target position meets the predetermined condition, the determining unit will control the calibration unit to utilize a reference pixel value of a reference pixel to correct the pixel value of the target position of the output frame.

17. The device of claim 16, wherein the output frame is corresponding to time T, and the reference pixel is located at the target position of a field corresponding to the time T−2.

18. The device of claim 16, wherein the output frame is corresponding to time T, and the reference pixel is located at the target position of a field corresponding to the time T−4.

* * * * *